(12) United States Patent
Smith et al.

(10) Patent No.: US 11,477,015 B1
(45) Date of Patent: Oct. 18, 2022

(54) QUANTUM STATE BLOCKCHAIN

(71) Applicant: Rigetti & Co, LLC, Berkeley, CA (US)

(72) Inventors: Robert Stanley Smith, Emeryville, CA (US); Nicholas C. Rubin, Berkeley, CA (US); Johannes Sebastian Otterbach, Oakland, CA (US)

(73) Assignee: Rigetti & Co, LLC, Berkeley, CA (US)

( * ) Notice: Subject to any disclaimer, the term of this patent is extended or adjusted under 35 U.S.C. 154(b) by 500 days.

(21) Appl. No.: 16/230,310

(22) Filed: Dec. 21, 2018

Related U.S. Application Data

(60) Provisional application No. 62/610,569, filed on Dec. 27, 2017.

(51) Int. Cl.
| | |
|---|---|
| *G05D 1/00* | (2006.01) |
| *H04L 9/08* | (2006.01) |
| *H04L 9/06* | (2006.01) |
| *H04L 67/104* | (2022.01) |
| *G06N 10/00* | (2022.01) |
| *H04L 9/00* | (2022.01) |

(52) U.S. Cl.
CPC .......... *H04L 9/0852* (2013.01); *G06N 10/00* (2019.01); *H04L 9/0637* (2013.01); *H04L 67/104* (2013.01); *H04L 9/50* (2022.05)

(58) Field of Classification Search
CPC ... H04L 9/0852; H04L 9/0637; H04L 67/104; H04L 2209/38; G06N 10/00
USPC ....................................................... 713/150
See application file for complete search history.

(56) References Cited

U.S. PATENT DOCUMENTS

| | | | | |
|---|---|---|---|---|
| 2006/0123363 A1* | 6/2006 | Williams | ............... | G06N 10/00 716/101 |
| 2009/0070402 A1* | 3/2009 | Rose | ...................... | B82Y 10/00 709/201 |

(Continued)

OTHER PUBLICATIONS

Bookatz, "QMA-complete problems", Quantum Info. Comput. 14, Aug. 22, 2013, 18 pgs.

(Continued)

*Primary Examiner* — Jeffrey C Pwu
*Assistant Examiner* — Nega Woldemariam
(74) *Attorney, Agent, or Firm* — Henry Patent Law Firm PLLC

(57) ABSTRACT

In some embodiments, a computing system may comprise a memory for storing a ledger; a computer processor for verification of the ledger, wherein the computer processor comprises at least one of a classical computer processor configured to run a virtual quantum machine and a quantum computer comprising a plurality of qubits; wherein the ledger is configured to store arbitrary classical information and quantum information which is verifiable using the computer processor. Furthermore, in some embodiments the computing system is configured to perform operations comprising: adding to the ledger using the computer processor to solve a mathematically difficult problem which is Quantum-Merlin-Arthur-complete (QMA-complete). In embodiments, a blockchain includes a quantum state. In some aspects, a unitary operator corresponding to a quantum rotation is found when new transaction data are to be secured in the blockchain.

21 Claims, 4 Drawing Sheets

(56) References Cited

U.S. PATENT DOCUMENTS

| | | |
|---|---|---|
| 2018/0260245 A1 | 9/2018 | Smith |
| 2018/0260730 A1 | 9/2018 | Reagor et al. |
| 2018/0267539 A1* | 9/2018 | Shih .................. G06Q 20/00 |
| 2018/0365585 A1 | 12/2018 | Smith et al. |
| 2019/0147431 A1* | 5/2019 | Galebach ............ H04L 9/3247 705/44 |

OTHER PUBLICATIONS

Bookatz , "QMA-complete problems", arXiv:1212.6312v3 [quant-ph], Nov. 21, 2013, 18 pgs.

Janzing , et al., ""Identity Check" is QMA-complete", arXiv:quant-ph/0305050v1, May 9, 2003, 9 pgs.

Janzing , et al., ""Non-Identity-Check" is QMA-Complete", International Journal of Quantum Information, vol. 3, No. 3, 2005, 11 pgs.

Ji, et al., "Complexity of Non-Identity Check for Short Circuits", Ninth Asian Conference on Quantum Information Science (AQIS'09), Aug. 27, 2009, 61 pgs.

Ji, et al., "Non-Identity Check Remains QMA-Complete for Short Circuits", Ninth Asian Conference on Quantum Information Science (AQIS'09), Jun. 30, 2008, 8 pgs.

Ji, et al., "Non-Identity Check Remains QMA-Complete for Short Circuits", arXiv:0906.5416v1 [quant-ph], Jun. 30, 2009, 8 pgs.

Kiktenko , "Quantum-secured blockchain", arXiv:1705.09258v2 [quant-ph], May 26, 2017, 6 pgs.

Narayanan , et al., "Bitcoin and Cryptocurrency Technologies", Princeton University Press, 2016, 308 pgs.

Rajan , et al., "Quantum Blockchain using entanglement in time", arXiv:1804.05979v1 [quant-ph], Apr. 16, 2018, 5 pgs.

Bookatz , "QMA-Complete Problems", Quantum Information and Computation, vol. 14, No. 5&6, 2014, 23 pgs.

* cited by examiner

QUANTUM STATE BLOCKCHAIN

CROSS-REFERENCE TO RELATED APPLICATIONS

This application claims priority to U.S. Provisional Application Ser. No. 62/610,569 entitled "Quantum State Blockchain" and filed on Dec. 27, 2017. The priority application is incorporated herein by reference.

BACKGROUND

The following description relates to a quantum state blockchain.

Blockchain systems have been used to provide a public, verifiable record of transactions. All Bitcoin transactions are currently secured using blockchain technology. In the protocol currently used for Bitcoin, transactions are added to the blockchain through distributed consensus of a peer-to-peer network, rather than a central authority such as a bank or government entity.

DETAILED DESCRIPTION

According to some embodiments, a blockchain system may comprise a ledger (e.g., a blockchain) stored in a classical memory and a quantum computer or virtual quantum machine (VQM) operating on classical hardware for verification of the ledger, wherein the quantum computer or VQM comprises a fixed number of qubits, although the security of the ledger increases with increasing number of qubits. The ledger is configured to store arbitrary classical information, which for example may include details of transactions, details of ownership of assets such as bitcoins, etc., as well as quantum information which is verifiable using the quantum computer/VQM. The amount of information stored per ledger entry, i.e. the information density, increases with the quality or fidelity of the qubits in the quantum computer.

According to some embodiments, a method of adding to the ledger, often referred to as "mining" in the context of blockchain, uses a quantum computer or VQM to solve a mathematically difficult problem which is Quantum-Merlin-Arthur-complete (QMA-complete), for example.

It is expected that QMA-complete problems may be used to help ensure the stability of blockchain systems, for example, by protecting against attacks that would leverage the computational power of a quantum computer. For instance, the techniques described herein are expected, in some cases, to prevent or reduce the likelihood of a successful "51-percent attack" on a blockchain system.

According to some embodiments, a blockchain system can maintain a quantum rotation ledger (QRL) by finding and evaluating unitary operators. For example, the unitary operators may be required to pass a Non-Identity Check described, a Non-Equivalence Check, or another type of criterion as described herein. Finding such unitary operators, subject to appropriate criteria, is provably "quantum hard" even for short circuits and consequently expensive even for a quantum computer.

In some implementations, the proof-of-work protocol in a blockchain system can be configured to produce output that is useful outside the context of the blockchain system. For example, the non-equivalence check can be useful outside the blockchain protocol. It is often useful in quantum computing systems to compile a given quantum logic circuit to a shorter-length quantum logic circuit; but proving equality of the two quantum logic circuits is a QMA-complete problem, as it reduces to proving that $UV^\dagger=1$, where the unitary operators U and V represent the two respective quantum logic circuits. In some cases, the proof can be expressed as a non-equivalency or non-identity check, and the miner nodes in the blockchain system can serve as a "crowd sourced compiler," where the miner nodes search for an equivalent but shorter circuit for a proposed quantum logic circuit.

Figure 1:
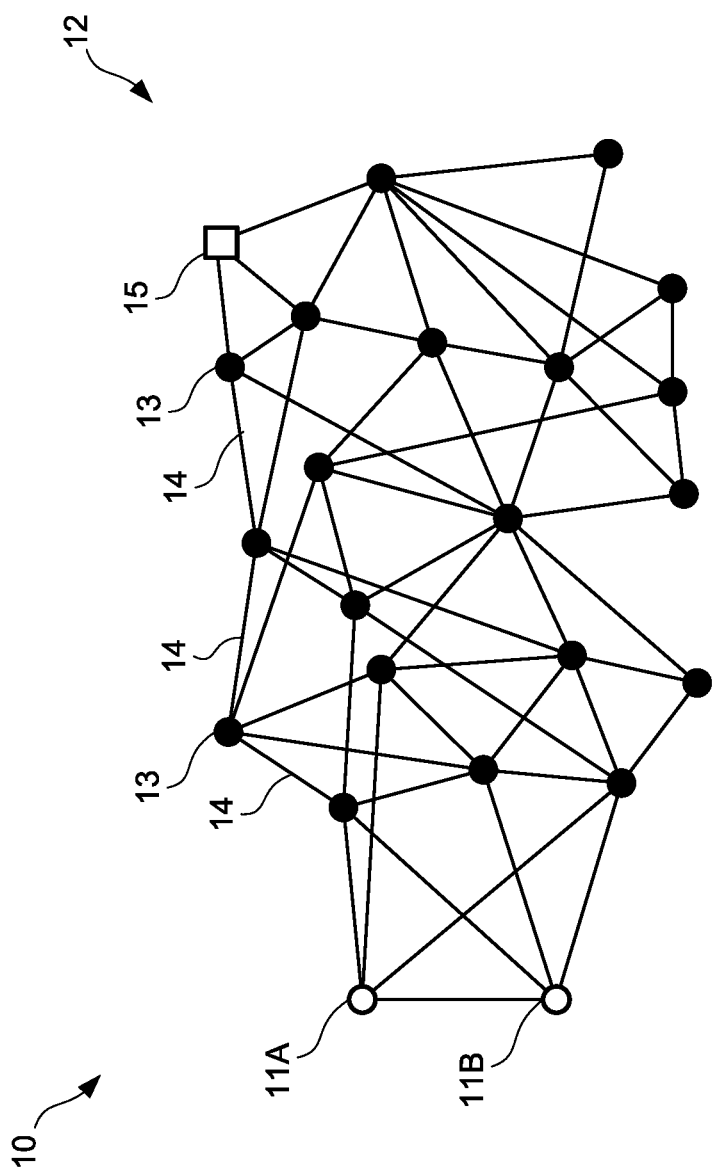
FIG. 1 is a schematic diagram of an example blockchain system.

FIG. 1 is a schematic diagram of an example blockchain system 10. The example blockchain system 10 includes account nodes 11A, 11B (open circles), miner nodes 13 (filled circles) and an administrator node 15 (square). The blockchain system 10 includes a peer-to-peer network 12 formed by peer-to-peer connections 14 between respective pairs of the miner nodes 13. The account nodes 11A, 11B and the administrator node 15 may also be part of the peer-to-peer network 12, or they may communicate with the miner nodes 13 using another communication protocol.

Each of the nodes in the example blockchain system 10 can be executed by a respective device or computer system, or multiple nodes may be executed on a single device or system. The blockchain system 10 can include many more nodes, including other types of nodes. For example, the blockchain system 10 can support hundreds, thousands, millions, or more, account nodes and miner nodes. A blockchain system may include additional or different features, and the components may be arranged as shown and described with respect to the example in FIG. 1 or in another manner.

Figure 4:
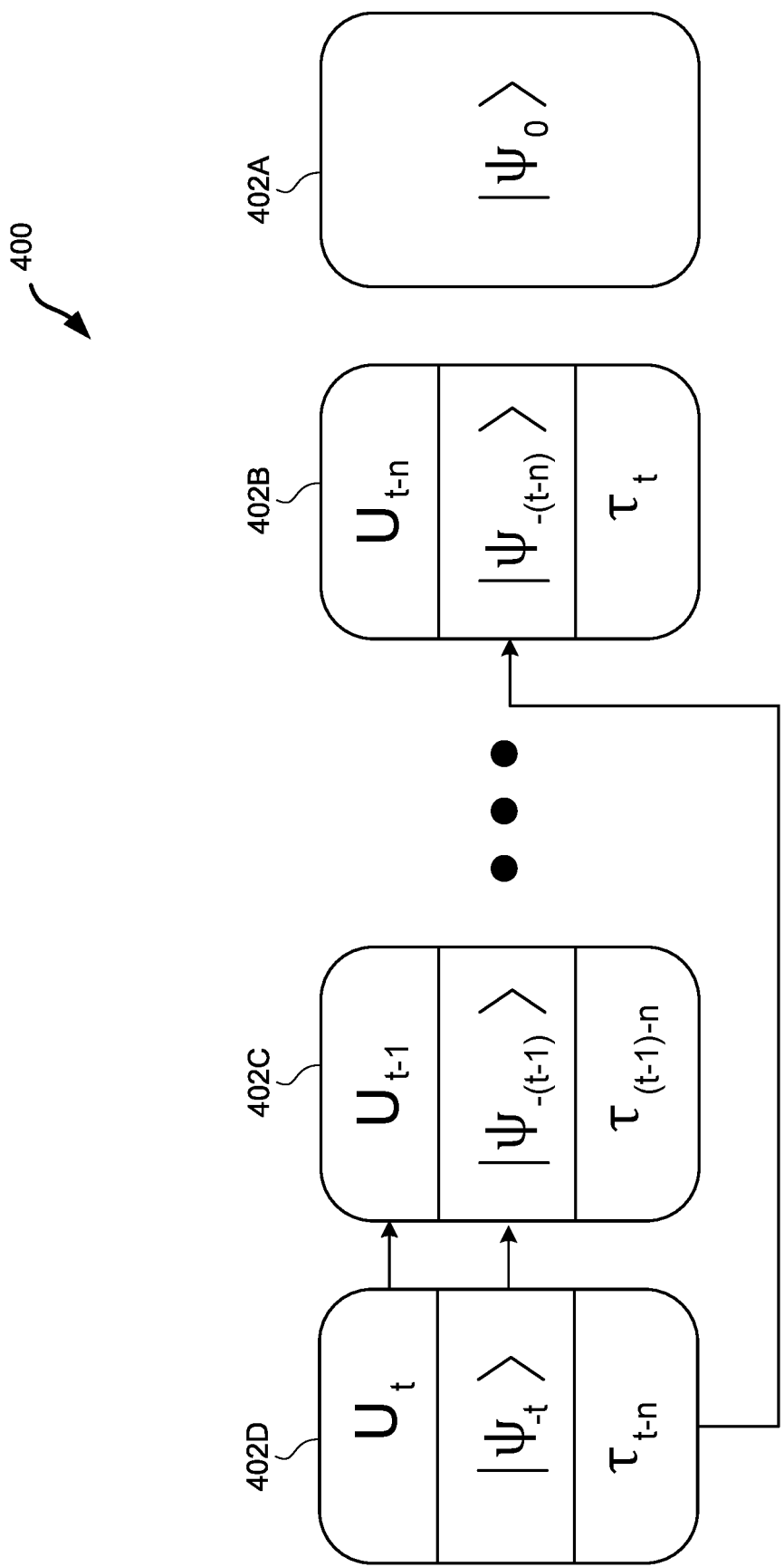
FIG. 4 is a schematic diagram of an example blockchain.

The example blockchain system 10 shown in FIG. 1 produces and maintains a blockchain that serves as a record of transactions. An example blockchain is shown in FIG. 4. The blockchain can be used to secure cryptocurrency transactions or other types of transactions (e.g., contracts, stock trades and settlements, property registration, etc.). As an example, the blockchain system 10 shown in FIG. 1 may produce and maintain a modified version of the blockchain currently used for Bitcoin transactions.

In the example blockchain system shown in FIG. 1, a blockchain protocol provides a set of rules (e.g., parameters and algorithms) for how the blockchain is constructed, maintained, verified and used in the blockchain system 10. As an example, a blockchain protocol may include rules for the content and format of blocks in the blockchain (including parameters for valid proof-of-work), rules for adding blocks to the blockchain by consensus, rules for validating a transaction added to the blockchain, rules for verifying the contents of the blockchain, etc.

Blockchains maintained by the example blockchain system 10 shown in FIG. 1 encode information in quantum states. For example, a blockchain may include a quantum state (e.g., a Quantum Rotation Ledger, QRL), and perform operations on the quantum state according to the techniques and rules described herein. In some implementations, each block added to the blockchain includes information that identifies a new quantum state, a quantum rotation that relates the new quantum state to one or more prior quantum states (identified in prior blocks in the blockchain), and other parameters. Accordingly, blocks can be verified by systems that can analyze or operate on quantum states, for example, by quantum computers or by classical computers that can emulate quantum computers.

The example account nodes 11A, 11B are each associated with an entity that engages in transactions in the blockchain system 10. The account nodes 11A, 11B can operate similar to a so-called "light node" in the Bitcoin network. The account nodes 11A, 11B can initiate new transactions with other account nodes, request new transactions be added to the blockchain, and verify prior transactions that have been added to the blockchain. In some examples, each of the account nodes 11A, 11B operates a cryptocurrency wallet software, which is used to make purchases or sales with cryptocurrency.

The example account nodes 11A, 11B can be implemented by software executed on a smartphone or another type of "smart" device, an Internet-of-things (IoT) device, a laptop computer, a tablet device, a personal computer, a secure payment device, a server system, or another type of computing system. In some cases, the account nodes 11A, 11B have access to, or include, quantum computing resources. As an example, an account node may include Quantum Processor Unit (QPU) hardware, a Virtual Quantum Machine (VQM) executed on classical hardware, or other types of hardware that can run quantum algorithms locally at the access node. As another example, an account node may have access to a cloud-based QPU system or other quantum computing resource that can run quantum algorithms remotely from the access node. Accordingly, the example account nodes 11A, 11B can be implemented using entirely "classical" computing hardware, or the example account nodes 11A, 11B may include some quantum computing hardware. The quantum resources available to the account nodes 11A, 11B may be used to verify the validity of a quantum state, quantum rotation operator, or other information in the blockchain.

In the example shown in FIG. 1, each entity that engages in transactions in the blockchain system 10 has a distinct account identity in the blockchain system 10. In some implementations, each account identity is associated with a respective cryptographic key pair, which includes a public key and private key. The private key can be stored (e.g., by an account node) as a secure secret that is not shared with other entities, and the public key can be published to other nodes in the blockchain system 10. The cryptographic key pair associated with an account identity can be used in the blockchain system 10 to authenticate transactions associated with that account identity. For example, when a transaction is approved by an entity associated with the account node 11A, the account node 11A may use the entity's private key to generate a digital signature on the transaction data, and other nodes may use the entity's public key to verify the digital signature.

In the example shown, the account nodes 11A, 11B can access public data (including components of the blockchain, public keys of other entities, etc.) and execute blockchain protocols that an individual entity needs in order to engage in and verify transactions in the blockchain system 10. In a cryptocurrency example, a first account node 11A associated with a first entity ("Alice") performs a cryptocurrency transaction with a second account node 11B associated with a second entity ("Bob"), e.g., Alice sends Bob some amount of Bitcoin. In this example, the account node 11B may access portions of the blockchain necessary to verify that the specified amount of cryptocurrency can be validly exchanged (e.g., to verify Alice's ownership of the specified amount of cryptocurrency, and to verify no double spending), and the account node 11B may access Alice's public key to verify that Alice approved the transaction. Similarly, the account node 11A may access portions of the blockchain necessary to demonstrate that the specified amount of cryptocurrency can be validly exchanged, and the account node 11A may access Bob's public key to verify his identity.

The account nodes 11A, 11B can interact with each other over any type of public or private data connection. For example, the account nodes may communicate with each other over the Internet, over a private network, or otherwise. Continuing the cryptocurrency example, the account nodes 11A, 11B can communicate with each other to generate transaction data for the cryptocurrency transaction. For instance, if Alice and Bob have agreed on a specified amount of Bitcoin that will be exchanged, the first account node 11A can generate transaction data indicating that the specified amount of Bitcoin will be transferred from Alice's account to Bob's account. The first account node 11A uses Alice's private key to generate a digital signature on the transaction data, and the digitally-signed transaction data may then be sent to the account node 11B for approval by Bob. The digitally-signed transaction data can be sent (e.g., broadcast to or otherwise distributed in) the peer-to-peer network 12 from either of the account nodes 11A or 11B. Miner nodes 13 in the peer-to-peer network 12 receive the transaction data and generate blocks to secure the transaction data in the blockchain.

In the example shown in FIG. 1, the example miner nodes 13 are each associated with an entity that generates blocks to be added to the blockchain in the blockchain system 10. The miner nodes 13 can operate similarly to a so-called "full node" in the Bitcoin network. The miner nodes 13 can receive new transactions (e.g., from account nodes), perform "proof of work" operations, generate blocks to be added to the blockchain, and verify prior transactions that have been added to the blockchain. In some examples, each of the miner nodes 13 operates a cryptocurrency mining software, which is used to mine cryptocurrency.

The example miner nodes 13 can be implemented by software executed on a high-performance computer system, a server cluster or server system, or another type of computing system. In the example shown in FIG. 1, the miner nodes 13 utilize quantum computing resources to perform mining operations. As an example, a miner node may include Quantum Processor Unit (QPU) hardware, a Virtual Quantum Machine (VQM) executed on classical hardware, or other types of hardware that can run quantum algorithms locally at the miner node. As another example, a miner node may have access to a cloud-based QPU system or other quantum computing resource that can run quantum algorithms remotely from the miner node. Accordingly, the example miner nodes 13 can be implemented using entirely "classical" computing hardware, or the example account miner nodes 13 may include some quantum computing hardware. The quantum resources available to the miner nodes 13 may be used to generate or verify the validity of a quantum state, quantum rotation operator, or other information in the blockchain. In some cases, one or more of the miner nodes 13 in FIG. 1 is implemented in the example computing environment 100 shown in FIG. 2. For example, the QPU 103 shown in FIG. 2 may operate as a miner node 13 in the peer-to-peer network 12 in FIG. 1.

In the example blockchain system 10 shown in FIG. 1, the miner nodes 13 receive transaction data for new transactions to be added to the blockchain, and the miner nodes 13 can generate new blocks that add the encode transactions in the blockchain. For a given transaction (or set of transactions), multiple miner nodes 13 will generally operate in parallel (e.g., in competition with each other) to generate a block that is valid according to the blockchain protocol. A miner node 13 that generates a valid block can publish the block to the peer-to-peer network 12, so that the block can be added to the blockchain by consensus among other nodes in the peer-to-peer network 12. In some cases, the first valid block published in the peer-to-peer network 12 is added to the blockchain, but additional or different criteria may be used to reach approval by consensus according to the blockchain protocol used by the blockchain network 10. In some embodiments, approval by consensus may follow a classical protocol that solves the Byzantine Generals problem.

Figure 3:
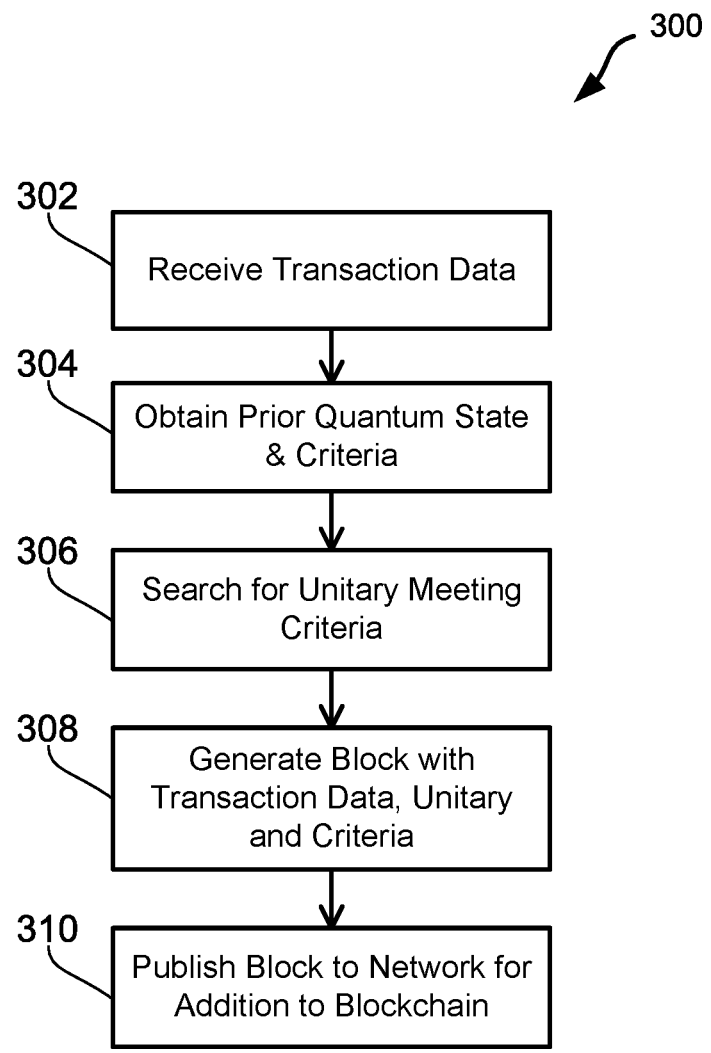
FIG. 3 is a flow chart showing an example blockchain mining process.

The blockchain protocol for the example blockchain system 10 may include parameters that define the proof-of-work required for a valid block that is eligible to be added to the blockchain. Each miner node 13 can include proof-of-work data in the blocks that they publish for addition to the blockchain, and each miner node 13 can verify the proof-of-work data in the blocks published by other miner nodes. Proof-of-work is generated by solving a hard computational problem specified by the blockchain protocol, and the miner nodes 13 must solve the hard computational problem for each new block generated. The parameters of the hard computational problem may change over time, and the solution will generally be different for each new transaction or set of transactions to be added to the blockchain. In some cases, a QMA-complete problem is solved by a miner node 13 to generate a new block and associated proof-of-work. An example process 300 that may be used for generating new blocks in the blockchain system 10 is shown in FIG. 3. Other types of processes may be used in some cases.

In the example blockchain system 10 shown in FIG. 1, the hard computational problem may include finding a quantum rotation. Quantum rotations correspond to unitary operators that rotate quantum states defined in a Hilbert space, and the dimension of the unitary operator is therefore related to a size of the quantum state and the dimension of the Hilbert space. For example, an n-qubit quantum state can be represented in a $2^n$-dimensional Hilbert space, and a unitary operator that rotates the quantum state can be represented as a matrix of dimension $2^n \times 2^n$. Unitary operators and quantum rotations may be represented in another form or format. For example, a unitary operator may be represented as a quantum circuit that operates on n qubits, a quantum Hamiltonian, or another format.

The blockchain protocol can specify the rules and parameters that must be satisfied by a quantum rotation for valid proof-of-work. For example, the blockchain protocol may specify that a quantum rotation cannot be another specified operator (e.g., a "trivial" operator), or that the quantum rotation cannot be within some minimum distance of another specified operator. The other specified operator can be, for example, the identity operator or another quantum rotation, and the distance can be the norm or another distance measure.

In some implementations, the quantum rotation must satisfy a non-identity check, such as, for example, the Non-Identity Check formulation described below. The difficulty of finding a quantum rotation that satisfies the non-identity check (and other rules of the blockchain protocol) may be specified by parameters of the non-identity check, such as, for example, the parameters $\delta$ and $\mu$ in the formulation provided by equations (8) and (9) below. In this example, the parameters $\delta$ and $\mu$ specify minimum thresholds for rotations that will be accepted by the blockchain protocol.

In some implementations, the quantum rotation must satisfy a non-equivalence check, such as, for example, the Non-Equivalence Check formulation described below. The difficulty of finding a quantum rotation that satisfies the non-equivalence check (and other rules of the blockchain protocol) may be specified by parameters of the non-equivalence check, such as, for example, the parameters $\delta$ and $\mu$ in the formulation provided by equations (10) and (11) below. In this example, the parameters $\delta$ and $\mu$ specify minimum thresholds for rotations that will be accepted by the blockchain protocol.

In some implementations, the quantum rotation must "connect" two predefined quantum states in a Hilbert space, for example, by rotating the first quantum state to the second quantum state (or to another quantum state that overlaps the second quantum state within some threshold). For example, the predefined first and second quantum states can be provided as inputs for a process that finds quantum rotations. The difficulty of finding a quantum rotation that connects the two predefined quantum states may be specified by a threshold parameter r, which specifies a minimum overlap between the predefined second quantum state and the output of the quantum rotation (generated by applying the quantum rotation to the predefined first quantum state). The overlap between two quantum states can be measured by the dot product between the states, or otherwise. In some implementations, the quantum rotation must rotate a first predefined quantum state to another state that overlaps multiple (n number of) other quantum states within the minimum threshold $\tau$, for example, as provided by rule ($\gamma$) given below.

When a miner node 13 generates a new block based on new transaction data, the new block may include information representing the quantum rotation found by the miner node 13, as well as other information that can be used to validate the block. For instance, the miner node 13 may include information representing the quantum rotation, a quantum state representation of the transaction data, all or part of one or more of the predefined quantum states that the quantum rotation produces or operates on, one or more parameters (e.g., the one or more of the parameters $\tau$, $\delta$ and $\mu$) satisfied by the quantum rotation, or a combination of these and other parameters. As an example, a miner node 13 may produce a block for the example blockchain 400 shown in FIG. 4, or another type of block.

The blocks generated by the miner nodes 13 may include additional information, for example, the type of information that would be included in a block for a Bitcoin transaction. For example, a block may include a description of a transaction, including the entities (or account identities) and details of the transaction (e.g., the amount of cryptocurrency transferred). In some examples, the miner nodes 13 earn cryptocurrency by generating valid blocks, and the miner nodes 13 may include a "minting" transaction in a block, whereby new cryptocurrency is created in the cryptocurrency system.

In some instances, miner nodes 13 also verify transactions or blocks that have been added to the blockchain. In some instances, the blockchain system 10 may include separate verifier nodes that serve primarily to verify blocks for addition to the blockchain. For example, a verifier node may receive a new block that a miner node 13 has tendered for addition to the blockchain. The verifier node may verify that the block complies with the blockchain protocol, for example, by applying a verification process to the block. The verification process may verify that the quantum state in the block properly encodes a valid transaction, that a unitary operator in the block satisfies all relevant criteria (e.g., using the relevant values for one or more of the parameters $\tau$, $\delta$ and $\mu$) specified by the blockchain protocol, or perform other types of verification operations.

In some implementations, the example administrator node 15 can be implemented by any of the types of hardware discussed above with respect to the account nodes 11A, 11B and miner nodes 13. The administrator node 15 can determine, suggest or verify modifications for the blockchain protocol, distribute or verify software to be executed by other nodes in the blockchain system 10, and perform other operations that support operation of the blockchain system 10. The administrator node 15 does not serve as an authority that explicitly approves blocks or transactions, or otherwise operate as a central authority for maintaining the blockchain. Rather, the administrator node 15 provides support that allows the peer-to-peer network 12 to operate as a distributed resource that maintains the blockchain by consensus.

In some implementations, the administrator node 15 can specify values of parameters (e.g., the one or more of the parameters $\tau$, $\delta$ and $\mu$) in order to control the difficulty of the hard computational problem, and thereby control the rate at which valid blocks are generated (e.g., on average). For example, to increase the difficulty of finding a valid quantum rotation, one or more of the parameters $\tau$, $\delta$ and $\mu$ can be increased, or the parameter $\mu$ can be decreased, as described below. As another example, to decrease the difficulty of finding a valid quantum rotation, one or more of the parameters $\tau$, $\delta$ and n can be decreased, or the parameter $\mu$ can be increased, as described below. In some cases, the size of the quantum state (e.g., the size of the Quantum Rotation Ledger, QRL) can be increased to modified or manipulate the difficulty of finding a valid quantum rotation (increasing the size of the quantum state will increase difficulty; decreasing the size of the quantum state will reduce difficulty).

Figure 2:
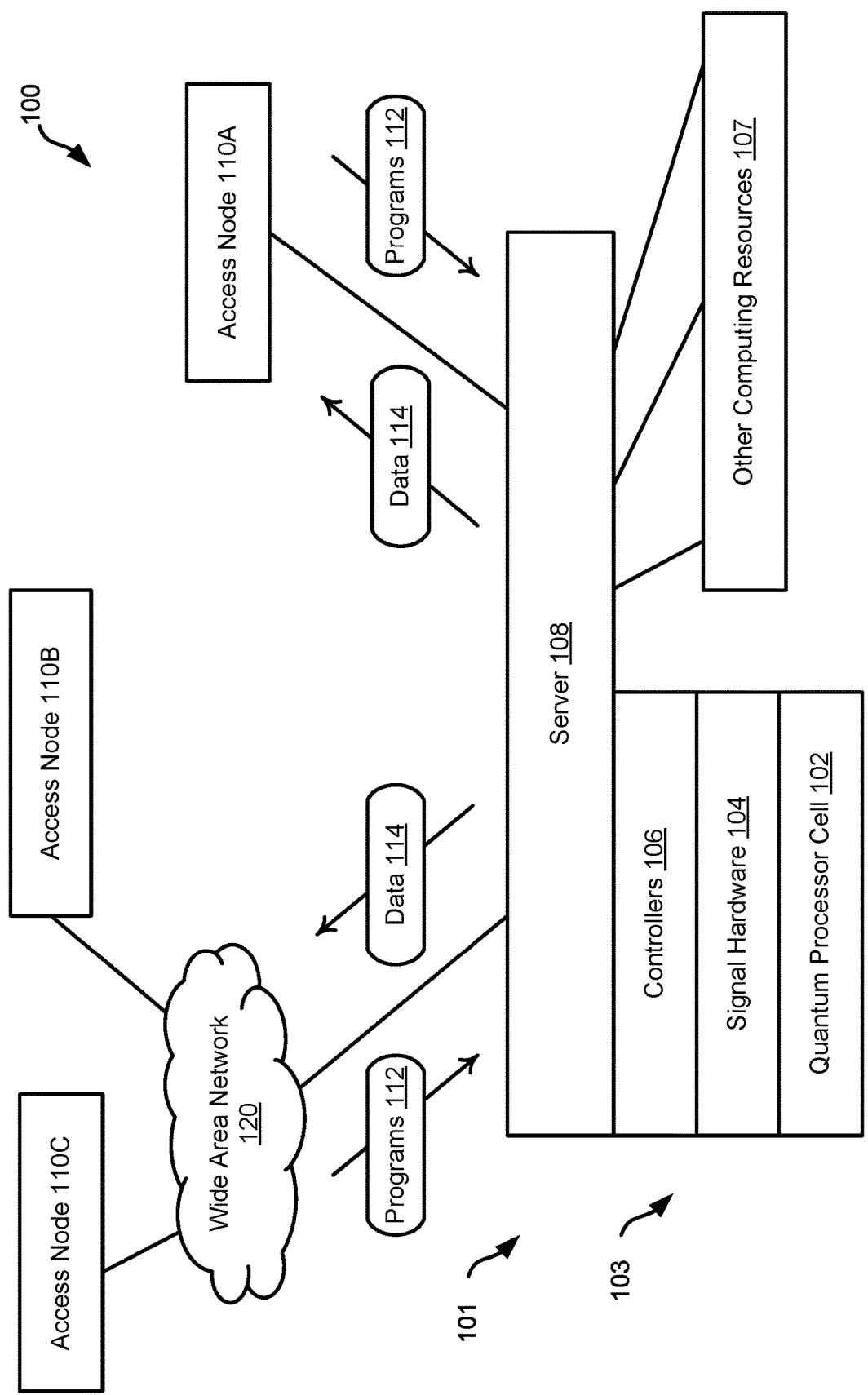
FIG. 2 is a block diagram of an example computing system.

FIG. 2 is a block diagram of an example computing system 100. The example computing system 100 shown in FIG. 2 includes a computing environment 101 and access nodes 110A, 110B, 110C. A computing system may include additional or different features, and the components of a computing system may operate as described with respect to FIG. 2 or in another manner.

The example computing environment 101 includes computing resources and exposes their functionality to the access nodes 110A, 110B, 110C (referred to collectively as "access nodes 110"). The computing environment 101 shown in FIG. 2 includes a server 108, a quantum processor unit 103 and other computing resources 107. The computing environment 101 may also include one or more of the access nodes (e.g., the example access node 110A) and other features and components. A computing environment may include additional or different features, and the components of a computing environment may operate as described with respect to FIG. 2 or in another manner.

The example computing environment 101 can provide services to the access nodes 110, for example, as a cloud-based or remote-accessed computer, as a distributed computing resource, as a supercomputer or another type of high-performance computing resource, or in another manner. As shown in FIG. 2, to access computing resources of the computing environment 101, the access nodes 110 send programs 112 to the server 108 and in response, the access nodes 110 receive data 114 from the server 108. The access nodes 110 may access services of the computing environment 101 in another manner, and the server 108 or other components of the computing environment 101 may expose computing resources in another manner.

Any of the access nodes 110 can operate local to, or remote from, the server 108 or other components of the computing environment 101. In the example shown in FIG. 2, the access node 110A has a local data connection to the server 108 and communicates directly with the server 108 through the local data connection. The local data connection can be implemented, for instance, as a wireless Local Area Network, an Ethernet connection, or another type of wired or wireless connection. Or in some cases, a local access node can be integrated with the server 108 or other components of the computing environment 101. Generally, the computing system 100 can include any number of local access nodes.

In the example shown in FIG. 2, the access nodes 110B, 110C each have a remote data connection to the server 108, and each communicates with the server 108 through the remote data connection. The remote data connection in FIG. 2 is provided by a wide area network 120, such as, for example, the Internet or another type of wide area communication network. In some cases, remote access nodes use another type of remote data connection (e.g., satellite-based connections, a cellular network, a private network, etc.) to access the server 108. Generally, the computing system 100 can include any number of remote access nodes.

The example server 108 shown in FIG. 2 communicates with the access nodes 110 and the computing resources in the computing environment 101. For example, the server 108 can delegate computational tasks to the quantum processor unit 103 and the other computing resources 107, and the server 108 can receive the output data from the computational tasks performed by the quantum processor unit 103 and the other computing resources 107. In some implementations, the server 108 includes a personal computing device, a computer cluster, one or more servers, databases, networks, or other types of classical or quantum computing equipment. The server 108 may include additional or different features and may operate as described with respect to FIG. 2 or in another manner.

The example quantum processor unit 103 operates as a quantum computing resource in the computing environment 101. The other computing resources 107 may include additional quantum computing resources (e.g., quantum processor units, quantum virtual machines, VQMs or quantum simulators) as well as classical (non-quantum) computing resources such as, for example, digital microprocessors, specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), etc., or combinations of these and other types of computing modules.

In some implementations, the server 108 generates computing jobs, identifies an appropriate computing resource in the computing environment 101 to execute the computing job, and sends the computing job to the identified resource for execution. For example, the server 108 may send a computing job to the quantum processor unit 103 or any of the other computing resources 107. A computing job can be formatted, for example, as a computer program, function, code or other type of computer instruction set. Each computing job includes instructions that, when executed by an appropriate computing resource, perform a computational task and generate output data based on input data. For example, a computing job can include instructions formatted for a quantum processor unit, a quantum virtual machine, VQM, a digital microprocessor, co-processor or other classical data processing apparatus, or another type of computing resource.

In some implementations, the server 108 operates as a host system for the computing environment 101. For example, the access nodes 110 may send programs 112 to server 108 for execution in the computing environment 101. The server 108 can store the programs 112 in a program queue, generate one or more computing jobs for executing the programs 112, generate a schedule for the computing jobs, allocate computing resources in the computing environment 101 according to the schedule, and delegate the computing jobs to the allocated computing resources. The server 108 can receive, from each computing resource, output data from the execution of each computing job. Based on the output data, the server 108 may generate additional computing jobs, generate data 114 that is provided back to an access node 110, or perform another type of action.

In some implementations, all or part of the computing environment 101 operates as a cloud-based quantum computing (QC) environment, and the server 108 operates as a host system for the cloud-based QC environment. For example, the programs 112 can be formatted as quantum computing programs for execution by one or more quantum processor units. The server 108 can allocate quantum computing resources (e.g., one or more QPUs, one or more quantum virtual machines, VQMs, etc.) in the cloud-based QC environment according to the schedule, and delegate quantum computing jobs to the allocated quantum computing resources for execution.

In some implementations, all or part of the computing environment 101 operates as a hybrid computing environment, and the server 108 operates as a host system for the hybrid environment. For example, the programs 112 can be formatted as hybrid computing programs, which include instructions for execution by one or more quantum processor units and instructions that can be executed by another type of computing resource. The server 108 can allocate quantum computing resources (e.g., one or more QPUs, one or more quantum virtual machines, VQMs, etc.) and other computing resources in the hybrid computing environment according to the schedule, and delegate computing jobs to the allocated computing resources for execution. The other (non-quantum) computing resources in the hybrid environment may include, for example, one or more digital microprocessors, one or more specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), or other types of computing modules.

In some cases, the server 108 can select the type of computing resource (e.g., quantum or otherwise) to execute an individual computing job in the computing environment 101. For example, the server 108 may select a particular quantum processor unit (QPU) or other computing resource based on availability of the resource, speed of the resource, information or state capacity of the resource, a performance metric (e.g., process fidelity) of the resource, or based on a combination of these and other factors. In some cases, the server 108 can perform load balancing, resource testing and calibration, and other types of operations to improve or optimize computing performance.

The example server 108 shown in FIG. 2 may include a quantum machine instruction library or other resources that the server 108 uses to produce quantum computing jobs to be executed by quantum computing resources in the computing environment 101 (e.g., by the quantum processor unit 103). The quantum machine instruction library may include, for example, specialized instructions to simplify or expedite solving difficult computational problems required by the blockchain system. The quantum machine instruction library may include, for example, procedures for automatically verifying copies of the blockchain ledger. The quantum machine instruction library may include, for example, calibration procedures, hardware tests, quantum algorithms, quantum gates, etc. The quantum machine instruction library can include a file structure, naming convention, or other system that allows the resources in the quantum machine instruction library to be invoked by the programs 112. For instance, the server 108 or the computing environment 101 can expose the quantum machine instruction library to the access nodes 110 through a set of application programming interfaces (APIs). Accordingly, the programs 112 that are produced by the access nodes 110 and delivered to the server 108 may include information that invokes a quantum machine instruction library stored at the server 108. In some implementations, one or more of the access nodes 110 includes a local version of a quantum machine instruction library. Accordingly, the programs 112 that are produced by the access node 110B and delivered to the server 108 may include instruction sets from a quantum machine instruction library.

The example quantum processor unit 103 shown in FIG. 2 can perform quantum computational tasks by executing quantum machine instructions. In some implementations, the quantum processor unit 103 can perform quantum computation by storing and manipulating information within quantum states of a composite quantum system. For example, qubits (i.e., quantum bits) can be stored in and represented by an effective two-level sub-manifold of a quantum coherent physical system. In some instances, quantum logic can be executed in a manner that allows large-scale entanglement within the quantum system. Control signals can manipulate the quantum states of individual qubits and the joint states of multiple qubits. In some instances, information can be read out from the composite quantum system by measuring the quantum states of the qubits. In some implementations, the quantum states of the qubits are read out by measuring the transmitted or reflected signal from auxiliary quantum devices that are coupled to individual qubits.

In some implementations, the quantum processor unit 103 can operate using gate-based models for quantum computing. For example, the qubits can be initialized in an initial state, and a quantum logic circuit comprised of a series of quantum logic gates can be applied to transform the qubits and extract measurements representing the output of the quantum computation. In some implementations, the quantum processor unit 103 can operate using adiabatic or annealing models for quantum computing. For instance, the qubits can be initialized in an initial state, and the controlling Hamiltonian can be transformed adiabatically by adjusting control parameters to another state that can be measured to obtain an output of the quantum computation.

In some models, fault-tolerance can be achieved by applying a set of high-fidelity control and measurement operations to the qubits. For example, quantum error correcting schemes can be deployed to achieve fault-tolerant quantum computation, or other computational regimes may be used. Pairs of qubits can be addressed, for example, with two-qubit logic operations that are capable of generating entanglement, independent of other pairs of qubits. In some implementations, more than two qubits can be addressed, for example, with multi-qubit quantum logic operations capable of generating multi-qubit entanglement. In some implementations, the quantum processor unit 103 is constructed and operated according to a scalable quantum computing architecture. For example, in some cases, the architecture can be scaled to a large number of qubits to achieve large-scale general purpose coherent quantum computing.

The example quantum processor unit 103 shown in FIG. 2 includes controllers 106, signal hardware 104, and a quantum processor cell 102. A quantum processor unit may include additional or different features, and the components of a quantum processor unit may operate as described with respect to FIG. 2 or in another manner.

In some instances, all or part of the quantum processor cell 102 functions as a quantum processor, a quantum memory, or another type of subsystem. In some examples, the quantum processor cell 102 includes a quantum circuit system. The quantum circuit system may include qubit devices, resonator devices and possibly other devices that are used to store and process quantum information. In some cases, the quantum processor cell 102 includes a superconducting circuit, and the qubit devices are implemented as circuit devices that include Josephson junctions, for example, in superconducting quantum interference device (SQUID) loops or other arrangements, and are controlled by radio-frequency signals, microwave signals, and bias signals delivered to the quantum processor cell 102. In some cases, the quantum processor cell 102 includes an ion trap system, and the qubit devices are implemented as trapped ions controlled by optical signals delivered to the quantum processor cell 102. In some cases, the quantum processor cell 102 includes a spin system, and the qubit devices are implemented as nuclear or electron spins controlled by microwave or radio-frequency signals delivered to the quantum processor cell 102. The quantum processor cell 102 may be implemented based on another physical modality of quantum computing.

In some implementations, the example quantum processor cell 102 can process quantum information by applying control signals to the qubits in the quantum processor cell 102. The control signals can be configured to encode information in the qubits, to process the information by performing quantum logic gates or other types of operations, or to extract information from the qubits. In some examples, the operations can be expressed as single-qubit logic gates, two-qubit logic gates, or other types of quantum logic gates that operate on one or more qubits. A sequence of quantum logic operations can be applied to the qubits to perform a quantum algorithm. The quantum algorithm may correspond to a computational task, a hardware test, a quantum error correction procedure, a quantum state distillation procedure, or a combination of these and other types of operations.

The example signal hardware 104 includes components that communicate with the quantum processor cell 102. The signal hardware 104 may include, for example, waveform generators, amplifiers, digitizers, high-frequency sources, DC sources, AC sources and other types of components. The signal hardware may include additional or different features and components. In the example shown, components of the signal hardware 104 are adapted to interact with the quantum processor cell 102. For example, the signal hardware 104 can be configured to operate in a particular frequency range, configured to generate and process signals in a particular format, or the hardware may be adapted in another manner.

In some instances, one or more components of the signal hardware 104 generate control signals, for example, based on control information from the controllers 106. The control signals can be delivered to the quantum processor cell 102 to operate the quantum processor unit 103. For instance, the signal hardware 104 may generate signals to implement quantum logic operations, readout operations or other types of operations. As an example, the signal hardware 104 may include arbitrary waveform generators (AWGs) that generate electromagnetic waveforms (e.g., microwave or radio-frequency) or laser systems that generate optical waveforms. The waveforms or other types of signals generated by the signal hardware 104 can be delivered to devices in the quantum processor cell 102 to operate qubit devices, readout devices, bias devices, coupler devices or other types of components in the quantum processor cell 102.

In some instances, the signal hardware 104 receives and processes signals from the quantum processor cell 102. The received signals can be generated by operation of the quantum processor unit 103. For instance, the signal hardware 104 may receive signals from the devices in the quantum processor cell 102 in response to readout or other operations performed by the quantum processor cell 102. Signals received from the quantum processor cell 102 can be mixed, digitized, filtered, or otherwise processed by the signal hardware 104 to extract information, and the information extracted can be provided to the controllers 106 or handled in another manner. In some examples, the signal hardware 104 may include a digitizer that digitizes electromagnetic waveforms (e.g., microwave or radio-frequency) or optical signals, and a digitized waveform can be delivered to the controllers 106 or to other signal hardware components. In some instances, the controllers 106 process the information from the signal hardware 104 and provide feedback to the signal hardware 104; based on the feedback, the signal hardware 104 can in turn generate new control signals that are delivered to the quantum processor cell 102.

In some implementations, the signal hardware 104 includes signal delivery hardware that interface with the quantum processor cell 102. For example, the signal hardware 104 may include filters, attenuators, directional couplers, multiplexers, diplexers, bias components, signal channels, isolators, amplifiers, power dividers and other types of components. In some instances, the signal delivery hardware performs preprocessing, signal conditioning, or other operations to the control signals to be delivered to the quantum processor cell 102. In some instances, signal delivery hardware performs preprocessing, signal conditioning or other operations on readout signals received from the quantum processor cell 102.

The example controllers 106 communicate with the signal hardware 104 to control operation of the quantum processor unit 103. The controllers 106 may include digital computing hardware that directly interfaces with components of the signal hardware 104. The example controllers 106 may include processors, memory, clocks and other types of systems or subsystems. The processors may include one or more single core or multi-core microprocessors, digital electronic controllers, special purpose logic circuitry, e.g., an FPGA (field programmable gate array) or an ASIC (application specific integrated circuit), or other types of data processing apparatus. The memory may include any type of volatile or non-volatile memory, a digital or quantum memory, or another type of computer storage medium. The controllers 106 may include additional or different features and components.

In some implementations, the controllers 106 include memory or other components that store quantum state information, for example, based on qubit readout operations performed by the quantum processor unit 103. For instance, the states of one or more qubits in the quantum processor cell 102 can be measured by qubit readout operations, and the measured state information can be stored in a cache or other type of memory system in one or more of the controllers 106. In some cases, the measured state information is used in the execution of a quantum algorithm, a quantum error correction procedure, a quantum processor unit (QPU) calibration or testing procedure, or another type of quantum process.

In some implementations, the controllers 106 include memory or other components that store quantum machine instructions, for example, representing a quantum program for execution by the quantum processor unit 103. In some cases, the quantum machine instructions are received from the server 108 in a hardware-independent format. For example, quantum machine instructions may be provided in a quantum instruction language such as Quil, described in the publication "A Practical Quantum Instruction Set Architecture," arXiv:1608.03355v2, dated Feb. 17, 2017, or another quantum instruction language. For instance, the quantum machine instructions may be written in a format that can be executed by broad range of quantum processor units, VQMs or quantum virtual machines.

In some instances, the controllers 106 can interpret the quantum machine instructions and generate hardware-specific control sequences configured to execute the operations proscribed by the quantum machine instructions. For example, the controllers 106 may generate control information that is delivered to the signal hardware 104 and converted to control signals that control the quantum processor cell 102.

In some implementations, the controllers 106 include one or more clocks that control the timing of operations. For example, operations performed by the controllers 106 may be scheduled for execution over a series of clock cycles, and clock signals from one or more clocks can be used to control the relative timing of each operation or groups of operations. In some cases, the controllers 106 schedule control operations according to quantum machine instructions in a quantum computing program, and the control information is delivered to the signal hardware 104 according to the schedule in response to clock signals from a clock or other timing system.

In some implementations, the controllers 106 include processors or other components that execute computer program instructions (e.g., instructions formatted as software, firmware, or otherwise). For example, the controllers 106 may execute a quantum processor unit (QPU) driver software, which may include machine code compiled from any type of programming language (e.g., Python, C++, etc.) or instructions in another format. In some cases, QPU driver software receives quantum machine instructions (e.g., based on information from the server 108) and quantum state information (e.g., based on information from the signal hardware 104), and generates control sequences for the quantum processor unit 103 based on the quantum machine instructions and quantum state information.

In some instances, the controllers 106 generate control information (e.g., a digital waveform) that is delivered to the signal hardware 104 and converted to control signals (e.g., analog waveforms) for delivery to the quantum processor cell 102. The digital control information can be generated based on quantum machine instructions, for example, to execute quantum logic operations, readout operations, or other types of control.

In some instances, the controllers 106 extract qubit state information from qubit readout signals, for example, to identify the quantum states of qubits in the quantum processor cell 102 or for other purposes. For example, the controllers may receive the qubit readout signals (e.g., in the form of analog waveforms) from the signal hardware 104, digitize the qubit readout signals, and extract qubit state information from the digitized signals.

In some implementations, all or part of the computing system 100 shown in FIG. 2 can be used by, or deployed as, one or more nodes in the blockchain system 10 shown in FIG. 1. For instance, one or more of the access nodes 110A, 110B, 110C in FIG. 2 can be used by, or deployed as, one or more of the account nodes 11A, 11B or one or more of the miner nodes 13 in FIG. 1, which allows the nodes of the blockchain system 10 shown in FIG. 1 to access the computing environment 101 shown in FIG. 2. As an example, the local access node 110A can be deployed as a miner node 13 in the peer-to-peer network 12 shown in FIG. 1, and the local access node 110A can utilize the quantum computing resources in the computing environment 101 to perform mining operations. As another example, the remote access node 110B can be deployed as an account node 11A or 11A in FIG. 1, and the remote access node 110B can utilize the quantum computing resources in the computing environment 101 to perform verification operations.

In some cases, the server 108 and/or the QPU 103 and/or other computing resources 107 in FIG. 2 is used by, or deployed as, one or more of the account nodes 11A, 11B or one or more of the miner nodes 13 in FIG. 1 and performs the associated operations. The server 108 may communicate (directly or indirectly) with other nodes in the blockchain system, and delegates certain operations (e.g., generating proof-of-work by finding solutions to QMA-complete problems) to the QPU 103 and/or the server 108 and/or other computing resources 107. For example, the server 108 or a classical co-processor may perform operations 302, 304, 308 and 310 in the example process 300 shown in FIG. 3, and the server 108 may delegate all or part of operation 306 to the QPU 103 or to a QVM included in the other computing resources 107. As another example, the server 108 may gather information needed to verify a transaction on the blockchain, and the server 108 may delegate quantum rotation operations to the QPU 103 or to a QVM included in the other computing resources 107.

In some examples, the QPU 103 can execute an algorithm to find or verify a quantum rotation that satisfies criteria of the blockchain system. For instance, the controllers 106 may receive and execute a quantum program 112 that causes the QPU 103 to perform such an algorithm. The QPU 103 can perform quantum rotations, for example, by encoding an initial state in a set of qubits in the quantum processor cell 102, and generating a control sequence corresponding to the unitary operator that represents the quantum rotation. The controllers 106 can generate the control sequence, and the signal hardware 104 can deliver the control sequence to the quantum processor cell 102. Delivering the control sequence to the quantum processor cell 102 transforms the initial quantum state to an output quantum state in the quantum processor cell 102, and the controllers 106 can then execute a readout process to identify the output quantum state produced by the quantum rotation.

FIG. 3 is a flow chart showing an example blockchain mining process 300. The mining process 300 may be performed, for example, by miner nodes 13 in the example blockchain system 10 shown in FIG. 1, or by a node in another type of system. Operations in the example process 300 may be executed by hardware, for instance, by one or more components of the example computing environment 101 shown in FIG. 2. For example, the process 300 may be performed by the QPU 103, or by the QPU 103 and the server 108, or by a quantum virtual machine (or VQM) executed by the additional computing resources 107.

In the example process 300 shown in FIG. 3, some of the operations are performed by classical computing resources (e.g., a digital microprocessor) and others are performed by quantum computing resources (e.g., a quantum processor). For example, in some implementations, all or part of operation 306 is performed by a quantum processor unit, and all other operations are performed by a classical co-processor. In the example computing environment 101 shown in FIG. 2, executing operation 306 in FIG. 3 may include processing information in the quantum processor cell 102 (and in some embodiments storing information in the quantum processor), while other operations in FIG. 3 may be executed by a classical processor (e.g., in the controllers 106, the server 108 or the additional computing resources 107). The process 300 can be executed by other types of hardware. For instance, a conventional (classical) computer system may be reprogrammed to perform the process 300 in some cases.

The example process 300 may include additional or different operations, and the operations may be performed in the order shown or in another order. In some cases, one or more of the operations shown in FIG. 3 are implemented as processes that include multiple operations, sub-processes or other types of routines. In some cases, operations can be combined, performed in another order, performed in parallel, iterated, or otherwise repeated or performed in another manner.

At 302, transaction data are received. For example, the transaction data may be received by a miner node in a blockchain system. In some cases, the transaction data are broadcast (e.g., by an account node) to a peer-to-peer network, and multiple miner nodes in the peer-to-peer network each receive the same transaction data. The miner nodes may then work independently, each performing the remaining operations in the process 300, to generate a new block that secures the transaction in the blockchain.

The transaction data received at 302 may include a single transaction or multiple transactions. In some cases, transaction data are formatted as a Merkle tree data structure that contains many transactions. The transaction data can be formatted as a binary data set or another type of data. In some cases, the transaction data can be formatted similarly to the way that transaction data are formatted in current Bitcoin protocols. In some instances, the transaction data may be formatted in another manner. In some cases, the transaction data may be formatted as a larger quantum state that is rotated onto the quantum state stored in the blockchain. This larger quantum state could be, for example, a highly entangled state exposing a unique entanglement signature. Although an example embodiment is given below where the transaction data is a single bit (encoded in the qubit state $|q_{-t}\rangle$ ), the transaction data can be several bytes or kilobytes in size, or larger.

At 304, a prior state and criteria are obtained. The prior state obtained at 304 represents a prior quantum state associated with a prior block of the blockchain. For example, the prior quantum state can include a prior n-qubit quantum state $|\Phi_{t-1}\rangle$. Here, t is an integer representing an index for the block to be added to the blockchain. As such, the prior quantum state can be the n-qubit quantum state identified in the most recently-added block in the blockchain, or an earlier block in the blockchain. The prior quantum state can be a prior state of the Quantum Rotation Ledger (QRL) or a component of a prior state of the QRL.

In the example shown in FIG. 3, the criteria obtained at 304 include the criteria that a unitary operator must satisfy to constitute valid proof-of-work according to the blockchain protocol. The criteria may include values for any of the threshold parameters $\tau$, $\delta$ and $\mu$ discussed above and in the example embodiment below. The criteria may include values for additional or different types of parameters or other types of criteria.

At 306, a unitary operator is searched for, and in some cases, a unitary operator is found. The unitary operator that is searched for (and in some instances, is found) at 306 is one that encodes the new transaction data in a new quantum state in accordance with the blockchain protocol. For example, the unitary operator may encode the new transaction data in a new quantum state of the Quantum Rotation Ledger (QRL). The example embodiment below shows an example of a unitary operator $U_t$ that encodes new transaction data $|q_{-t}\rangle$ in a new n-qubit quantum state $|\Phi_t\rangle$. Here, t is an integer representing an index for the block to be added to the blockchain. The unitary operator corresponds to a quantum rotation, which may be considered a coherent transformation between states of a quantum system.

In some cases, the search conducted at 306 may utilize an algorithm that is based on the verification technique described in the publication entitled "Identity Check is QMA-Complete" (by D. Janzing, et al., available at https://arxiv.org/abs/quant-ph/0305050, dated May 9, 2003), which contains a verification algorithm for the Non-Identity check. For instance, one could investigate a process in which the verification algorithm is applied to proposed unitary operators until a valid one (e.g., one meeting all the criteria of the blockchain protocol) is found; a randomized process, a machine-learning process, or another type of process can be used to generate proposed unitary operators until a valid one is found.

In some cases, at 306, a miner node searches for a unitary operator that satisfies a non-identity check requirement in accordance with the blockchain protocol. For example, the blockchain protocol may specify the Non-Identity Check as described below, with values for the parameters $\delta$ and $\mu$. In some cases, at 306, a miner node searches for a unitary operator that satisfies a non-equivalency check requirement in accordance with the blockchain protocol. For example, the blockchain protocol may specify the Non-Equivalency Check provided in the example embodiment below, with values for the parameters $\delta$ and $\mu$.

In some cases, at 306, a miner node searches for a unitary operator $U_t$ that rotates a first quantum state to a second quantum state, where the first quantum state includes the transaction data appended to the prior n-qubit quantum state $|\Phi_{t-1}\rangle$, and the second quantum state includes the new n-qubit quantum state $|\Phi_t\rangle$ appended to additional data. In some cases, the transaction data is represented as a third quantum state $|q_{-t}\rangle$; the additional data is represented as a fourth quantum state $|q'_{-t}\rangle$; the first quantum state is the tensor product of the prior n-qubit quantum state $|\Phi_{t-1}\rangle$ and the third quantum state $|q_{-t}\rangle$; and the second quantum state is the tensor product of the fourth quantum state $|q'_{-t}\rangle$ and the initial n-qubit quantum state $|\Phi_t\rangle$. The unitary operator may have the property that $$U_t(|\Phi_{t-1}\rangle \otimes |q_{-t}\rangle) = |q'_{-t}\rangle \otimes |\Phi_t\rangle \quad (1).$$

In some cases, at 306, a miner node searches for a unitary operator $U_t$ that satisfies a requirement of the blockchain protocol regarding a relationship between the fourth quantum state $|q'_{-t}\rangle$ and a fifth quantum state $|q_{-(t-1)}\rangle$. Here, the fifth quantum state $|q_{-(t-1)}\rangle$ represents transaction data associated with a prior transaction that has previously been secured by the blockchain. For example, the criteria (obtained at 304) may require $$\langle q'_{-t} | q_{-(t-n)} \rangle \geq \tau \quad (2),$$

for all n<t, where n indicates the size of the rotation state, (t−n) is the state that has been rotated into the state n steps ago and is now checked against the state that has been rotated off, to give some guarantees about the information. Other criteria may be used.

At 308, a block is generated; the block includes information uniquely identifying the transaction data (received at 302), the unitary operator (found at 306), an updated quantum state, and the criteria (obtained at 304). As an example, the information that uniquely identifies the transaction data may include a larger state containing the information of several transactions that are being rotated onto the ledger. The block may include additional or different information, and the information can be in any form or format.

At 310, the block (generated at 310) is published to a blockchain network for addition to the blockchain. For example, the miner node that generated the block may publish the block to the peer-to-peer network so that verifier nodes can verify the validity of the block. In some cases, the verification process uses a technique that is similar to the process used to find unitary operators (e.g., by a miner node, at 306). Or another technique may be used.

FIG. 4 is a schematic diagram of an example blockchain 400. The example blockchain 400 shown in FIG. 4 includes a series of blocks 402A, 402B, 402C, 402D, as well as other blocks that are not explicitly shown in FIG. 4. Each of the blocks is associated with an integer index i that indicates the block's position in the series. The initial block 402A is associated with the index i=0, which represents the first block in the blockchain. The initial block 402A can be generated, for example, by a system administrator or other entity.

The other blocks shown in FIG. 4 are transaction blocks 402B, 402C, 402D that each secure one or more transactions in the blockchain 400. The example blockchain 400 shown in FIG. 4 includes n transaction blocks. The transaction block 402B is associated with the index i=t−n; the transaction block 402C is associated with the index i=(t−1); and the transaction block 402D is associated with the index i=t.

Each of the transaction blocks 402B, 402C, 402D includes information identifying a unitary operator $U_i$, a new quantum state $|\Psi_{-i}\rangle$ in which new transaction data is encoded by the unitary operator $U_i$, and criteria that the unitary operator $U_i$ satisfies. In the example shown, the criteria r indicates a degree of overlap between pairs of quantum states. (Here, $|\Psi_{-i}\rangle$ may correspond to $|q_{-t}\rangle$ in the discussion of FIG. 3 above.) The criteria in each block may indicate, for example, the minimum degree of overlap between a quantum state representing a new transaction and another quantum state produced by the addition of a prior transaction secured by the blockchain 400.

Here follows a detailed description of a Quantum Rotation Ledger, according to some embodiments. This particular embodiment is a quantum rotation ledger (QRL) based on evaluating the Non-Identity Check of a given unitary on a subset of n qubits, subject to the requirements of factorizing out old information when integrating new information into the n-qubit state. (This is akin to "popping off" or "dequeuing" from a last-in-first-out queue data structure.) See D. Janzing, P. Wocjan, and T. Beth, International Journal of Quantum Information 3, 463 (2005), available at http://www.worldscientic.com/doi/pdf/10.1142/S0219749905001067) for a discussion of the Non-Identity Check. Evaluating that the proposed unitary to achieve these operations is not close to a trivial identity is provably quantum hard even for short circuits that scale logarithmically in the number of qubits (see X. W. Zhengfeng Ji, Proc. Asian Conference on Quantum Information Science (2009), available at http://arxiv.org/abs/0906.5416) and consequently is expensive even for a quantum computer. The fact that this problem is hard for short-circuits makes is immediately applicable to near-term quantum computation hardware with only a moderate number of qubits.

The QRL is initialized in a n-qubit state $$|\Phi_0\rangle = \Sigma_{q_{n-1} \in \{0,1\}} \ldots \Sigma_{q_0 \in \{0,1\}} \lambda_{n-1}, \ldots, 0 | q_{n-1} \ldots q_0 \rangle \in B^n \quad (3),$$

where $B = \text{span}_C\{|0\rangle, |1\rangle\}$. To store some new block in the ledger, a new qubit state is created $$|q_{-1}\rangle \in B \quad (4)$$

that encodes the information of the block. The discussion here is restricted to just a single qubit, but the generalization to more qubits is straight-forward. The mining computation now consists of finding a unitary $$U: B^n \times B \to B \times B^n \quad (5)$$

that encodes a general n−1 qubit rotation $$U(|\Phi_0\rangle \otimes |q_{-1}\rangle) = |q''_{n-1}\rangle \otimes |\Phi_1\rangle \quad (6)$$

where $|\Phi_1\rangle$ is again an n-qubit state representing the new QRL state. It is important to note, that the full state is an (n+1)-qubit state but that the factorization happens to transform the product from the qubits $q^{th}$ positions in the least significant bit-position to the qubits with the most-significant bit position. No assumption is being made ab out the entanglement of states $|\Phi_0\rangle$ and $|\Phi_1\rangle$.

When the QRL is fully populated, of length n, qubits that that were previously pushed on the QRL state are popped off (dequeued). Performing a rotation according to a proposed unitary $U_{t1}$ at a transaction point $t_1 > n$ will pop off a qubit $|q''_{n-t1}\rangle$ whose information has been pushed on to the QRL state at transaction point $t_0 = t_1 - n$. For a proposed unitary to be valid one can now require that the overlap $$\langle q''_{n-t1} | q_{n-t0} \rangle \geq \tau \quad (7)$$

is larger than a threshold τ. This will limit the number of acceptable unitaries and moreover can be used to speed-up or throttle the block discovery time to keep a constant rate of new blocks created by the network similar to the current bitcoin system.

This in itself is not necessarily "hard" and could potentially be performed by an efficient classical system. To guarantee hardness one may need to impose more restrictions on the proposed unitaries $U_{t_i}$. There are several problems that may be useful to achieve this and it is expected that one can readily pick any of the QMA complete problems discussed, for example, in A. D. Bookatz, Quantum Info. Comput. 14, 361 (2014). Herein the discussion is focused on the problem of the Non-Identity Check, as it has some further advantages apart from being just "hard"—for example, the "hardness" can be tuned, as described below to control the rate of block creation.

Non-Identity Check. Given a unitary U implemented by a quantum circuit on n qubits, determine whether U is close to a trivial unitary in the following sense. Decide which of the two following cases is true given the guaranty that either of (i) or (ii) is satisfied:

(i) $\forall \varphi \in [0, 2\pi)$, $\|U - e^{i\varphi}\mathbb{1}\| \geq \delta$ (8), or (ii) $\exists \varphi \in [0, 2\pi)$, such that $\|U - e^{i\varphi}\mathbb{1}\| \leq \mu$ (9)

where $1/(\delta - \mu) \in \mathcal{O}(\text{poly}(n))$.

The parameters $\delta$, $\mu$ can again be used as throttles for the rate of block creation. Note that the definition states a guaranty that either of (i) or (ii) is satisfied; this might not always be true in practice if $\mu < \|U - e^{i\varphi}\mathbb{1}\| < \delta$. In this case the proposed circuit needs to be discarded and a new proposal needs to be evaluated. This is similar to the bitcoin-blockchain where the target hash range is so small that just exploring the leading nonce might not be sufficient to solve the hash-problem, which triggers an update in the coin base parameter of the underlying Merkle tree before re-evaluating all nonces.

The ingredients for creating the ledger have now been introduced. The data creating the ledger is a data-structure storing the following quantities:

(a) the initial QRL state $|\Phi_0\rangle = \Sigma_{q_{n-1} \in (0,1)} \ldots \Sigma_{q_0 \in \{0,1\}} \lambda \mathring{n} - 1, \ldots ,$ $0|q_{n-1} \ldots q_0\rangle \in B^n$, on n qubits.

(b) the transaction qubit states $|q_{-t}\rangle$, t=1, 2, ... that are pushed on the QRL.

(c) the unitaries $U_t$, t=1, 2, ... that encode the QRL transformation.

subject to the rules:

(α) $U_t$: $B^n \times B \to B \times B^n$, $U_t(|\Phi_{t-1}\rangle \otimes |q_{-t}\rangle) = |q'_{-t}\rangle \otimes |\Phi_t\rangle$.

(β) $U_t$ fulfills point (i) of the Non-Identity Check NIC[$\delta$, $\mu$].

(γ) $\langle q'_{-t}|q_{-(t-n)}\rangle \geq \tau$ for t>n.

The important parts are (i) that all operations can be stored classically as long as the transaction qubit states $|q_{-t}\rangle$ are not too complicated, i.e. can be represented classically in polynomial time/memory and (ii) the transaction validation itself is a highly non-trivial quantum operation, that can be stored as a sequence of gate instructions.

Furthermore, QRL is not limited to "quantum-only" hardware as naturally the NIC problem is also hard on a classical computer. Thus, implementing the QRL on classical hardware would render this technology robust against future quantum hardware attacks as long as the security guarantees of the blockchain are satisfied. See A. Narayanan, J. Bonneau, E. Felten, A. Miller, and S. Goldfeder, Bitcoin and Crypto currency Technologies (Princeton University Press, 2016).

Moreover, the core proof-of-work algorithm can be adjusted to be beneficial to the participants of the network. To this end assume that a participating node suggests a new unitary $C = UV^\dagger$. If the network proves that point (ii) of NIC holds, then one can assume with a reasonable probability that $UV^\dagger = 1$. If the problem is chosen by the submitting node in such a way that $|U| < |V|$, where $|\cdot|$ denotes the length of the circuit, then U is a compiled version of V with a smaller gate-depth. This is particularly useful for near-term devices where the circuit-depth is limited and hence compilation is important. The problem of deciding if U=V is also called the Non-Equivalence Check and can be described as given below.

Non-Equivalence Check. Given two unitaries, $U_1$ and $U_2$, implemented by a quantum circuit on n qubits, let $\mathscr{V}$ be a common invariant subspace of $B^{\otimes 2n}$ specified by a quantum circuit V (that ascertains with certainty whether a given input is in $\mathscr{V}$ not). The problem is to determine, given $U_1$, $U_2$, and V, whether the restrictions of $U_1$ and $U_2$ to rare not approximately equivalent, i.e. guaranteed one of either (i) or (ii) is true (i) $\exists |\psi\rangle \in \mathscr{V}$, such that $\forall \varphi \in [0, 2\pi)$, $\|$ $(U_1 U_2^\dagger - e^{i\varphi}\mathbb{1})|\psi\rangle\| \geq \delta$ (10)

(ii) $\exists \varphi \in [0, 2\pi)$, such that $\forall |\psi\rangle \in \mathscr{V}$, $\|$ $(U_1 U_2^\dagger - e^{i\varphi}\mathbb{1})|\psi\rangle\| \leq \mu$ (11)

where $1/(\delta - \mu) \in \mathcal{O}(\text{poly}(n))$.

This problem setup can provide great incentives to the participants. For example, if the unitary they suggest turns out to be close to the identity they will not necessarily push a block onto the ledger, however they gained a possibly optimized version of a circuit of their interest if the distributed network decides to publish the rejection calculation. This creates a crowd-sourced compiler network!

Some of the subject matter and operations described in this specification can be implemented in digital electronic circuitry or quantum processor circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media.

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a classical or quantum computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit), quantum information processing circuitry, or other types of systems.

Processors suitable for the execution of a computer program include, by way of example, both general and special purpose microprocessors, quantum information processors, and processors of any kind of digital or quantum computer. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device. Devices suitable for storing computer program instructions and data include all forms of non-volatile memory, media and memory devices, including by way of example quantum memory systems, semiconductor memory devices (e.g., EPROM, EEPROM, flash memory devices, and others), etc. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending data to and receiving data from a device that is used by the user; for example, by exchanging network packets with the device.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

The invention claimed is:

1. A method comprising:
   at a computer system, receiving transaction data associated with a new transaction to be secured by a blockchain according to a blockchain protocol;
   obtaining a prior quantum state;
   after obtaining the prior quantum state, by operation of the computer system, finding a unitary operator that encodes the new transaction in a new quantum state in accordance with the blockchain protocol, the unitary operator corresponding to a quantum rotation, wherein:
   t is an integer representing an index for a block to be added to the blockchain;
   the prior quantum state comprises a prior n-qubit quantum state $|\Phi_{t-1}\rangle$, and
   the new quantum state comprises a new n-qubit quantum state $|\Phi t\rangle$; and generating a block for addition to the blockchain, wherein the block comprises block data identifying the unitary operator and the new quantum state.

2. The method of claim 1, wherein finding the unitary operator comprises finding a unitary operator that satisfies a Non-Identity Check requirement in accordance with the blockchain protocol.

3. The method of claim 2, wherein the difficulty of the Non-Identity Check requirement is tuned to control the rate of block generation.

4. The method of claim 1, wherein finding the unitary operator comprises finding a unitary operator that satisfies a Non-Equivalency check requirement in accordance with the blockchain protocol.

5. The method of claim 1, wherein finding the unitary operator comprises finding a unitary operator $U_t$ that rotates a first quantum state to a second quantum state, the first quantum state comprises the transaction data appended to the prior n-qubit quantum state $|\Phi_{t-1}\rangle$, and the second quantum state comprises the new n-qubit quantum state $|\Phi_t\rangle$ appended to additional data.

6. The method of claim 5, wherein:
the transaction data comprises a third quantum state $|q_{-t}\rangle$;
the additional data comprises a fourth quantum state $|q_{-t}'\rangle$;
the first quantum state comprises the tensor product of the prior n-qubit quantum state $|\Phi_{t-1}\rangle$ and the third quantum state $|q_{-t}\rangle$; and
the second quantum state comprises the tensor product of the fourth quantum state $|q'_{-t}\rangle$ and the new n-qubit quantum state $|\Phi_t\rangle$, such that
$U_t(|\Phi_{t-1}\rangle \otimes |q_{-t}\rangle) = |q'_{-t}\rangle \otimes |\Phi_t\rangle$.

7. The method of claim 6, wherein finding the unitary operator comprises finding a unitary operator that satisfies a requirement of the blockchain protocol regarding a relationship between the fourth quantum state $|q'_{-t}\rangle$ and a fifth quantum state $|q_{-(t-1)}\rangle$ comprising transaction data associated with a prior transaction that has previously been secured by the blockchain.

8. The method of claim 7, wherein the blockchain protocol requires
$\langle q'_{-t} | q_{-(t-n)} \rangle \geq \tau$,
for all n<t, where r represents a threshold value specified by the blockchain protocol.

9. The method of claim 1, further comprising publishing the block in a peer-to-peer network for addition to the blockchain.

10. The method of claim 1, wherein the computer system comprises a classical computer system, and the classical computer system executes a virtual quantum machine to find the unitary operator.

11. The method of claim 1, wherein the computer system comprises a hybrid classical-quantum computer system that includes a classical processor and a quantum processor, and the quantum processor is used to find the unitary operator.

12. The method of claim 1, wherein the blockchain is stored in classical memory.

13. The method of claim 1, further comprising dequeuing a block from the blockchain.

14. The method of claim 1, wherein at least a portion of the blockchain is stored in quantum memory.

15. A computing system comprising:
memory storing blockchain data according to a blockchain protocol; and
one or more computer processors configured to perform operations comprising:
receiving transaction data associated with a new transaction to be secured by a blockchain according to the blockchain protocol;
obtaining a prior quantum state;
after obtaining the prior quantum state, finding a unitary operator that encodes the new transaction in a new quantum state in accordance with the blockchain protocol, the unitary operator corresponding to a quantum rotation wherein:
t is an integer representing an index for a block to be added to the blockchain;
the prior quantum state comprises a prior n-qubit quantum state $|\Phi_{t-1}\rangle$, and
the new quantum state comprises a new n-qubit quantum state $|\Phi_t\rangle$; and
generating a block for addition to the blockchain, wherein the block comprises block data identifying the unitary operator and the new quantum state.

16. The computing system of claim 15, wherein the memory is a classical memory.

17. The computing system of claim 15, wherein the one or more computer processors comprises a quantum computer.

18. The computing system of claim 15, wherein the memory comprises quantum memory.

19. A computing system comprising:
memory storing blockchain data according to a blockchain protocol; and
means for blockchain mining, wherein the means for blockchain mining comprises one or more processors configured to:
find a unitary operator that encodes a new transaction in a new quantum state in accordance with the blockchain protocol, wherein:
t is an integer representing an index for a block to be added to a blockchain:
a prior quantum state comprises a prior n-qubit quantum state $|\Phi_{t-1}\rangle$, and
the new quantum state comprises a new n-qubit quantum state $|\Phi_t\rangle$; and
generate a block for addition to a blockchain, wherein the block comprises block data identifying the unitary operator and the new quantum state.

20. The computing system of claim 19, wherein the means for blockchain mining comprises a hybrid classical-quantum computer system that includes a classical processor and a quantum processor, and the quantum processor is used to find the unitary operator.

21. The computing system of claim 19, wherein the memory comprises quantum memory.

* * * * *

UNITED STATES PATENT AND TRADEMARK OFFICE
CERTIFICATE OF CORRECTION

PATENT NO. : 11,477,015 B1
APPLICATION NO. : 16/230310
DATED : October 18, 2022
INVENTOR(S) : Smith et al.

It is certified that error appears in the above-identified patent and that said Letters Patent is hereby corrected as shown below:

In the Specification

Column 5, Line 43, delete "n-qubit" and insert -- $n$-qubit -- therefor.

Column 5, Line 49, delete "n" and insert -- $n$ -- therefor.

Column 5, Line 67, delete "δ and μ" and insert -- $\delta$ and $\mu$ -- therefor.

Column 6, Line 2, delete "δ and μ" and insert -- $\delta$ and $\mu$ -- therefor.

Column 6, Line 11, delete "δ and μ" and insert -- $\delta$ and $\mu$ -- therefor.

Column 6, Line 13, delete "δ and μ" and insert -- $\delta$ and $\mu$ -- therefor.

Column 6, Line 25, delete "r," and insert -- $\tau$, -- therefor.

Column 6, Line 33, delete "(n" and insert -- ($n$ -- therefor.

Column 6, Line 34, delete "τ," and insert -- $\tau$, -- therefor.

Column 6, Line 34, delete "γ" and insert -- $\gamma$ -- therefor.

Column 6, Lines 45-46, delete "τ, δ and μ)" insert -- $\tau$, $\delta$ and $\mu$) -- therefor.

Column 7, Lines 6-7, delete "τ, δ and μ)" insert -- $\tau$, $\delta$ and $\mu$) -- therefor.

Column 7, Line 25, delete "τ, δ and μ)" insert -- $\tau$, $\delta$ and $\mu$) -- therefor.

Column 7, Line 29, delete "τ, δ" and insert -- $\tau$, $\delta$ -- therefor.

Signed and Sealed this
Twenty-fourth Day of January, 2023

*Katherine Kelly Vidal*

Katherine Kelly Vidal
*Director of the United States Patent and Trademark Office*

CERTIFICATE OF CORRECTION (continued)
U.S. Pat. No. 11,477,015 B1

Column 7, Line 29, delete "μ" and insert -- $\mu$ -- therefor.

Column 7, Line 30, delete "μ" and insert -- $\mu$ -- therefor.

Column 7, Line 33, delete "τ, δ" and insert -- $\tau, \delta$ -- therefor.

Column 7, Line 33, delete "n" and insert -- $\mu$ -- therefor.

Column 7, Line 33, delete "μ" and insert -- $\mu$ -- therefor.

Column 14, Line 26, delete "11A or 11A" and insert -- 11A or 11B -- therefor.

Column 15, Line 62, delete "$|q_{-t}\rangle),$" and insert -- $|q_{-t}\rangle),$ -- therefor.

Column 15, Line 69, delete "n-qubit" and insert -- $n$-qubit -- therefor.

Column 16, Line 1, delete "$|\Phi_{t-1}\rangle.$" and insert -- $|\Phi_{t-1}\rangle.$ -- therefor.

Column 16, Line 1, delete "t" and insert -- $t$ -- therefor.

Column 16, Line 3, delete "n-qubit" and insert -- $n$-qubit -- therefor.

Column 16, Line 13, delete "τ, δ and μ" and insert -- $\tau, \delta$ and $\mu$ -- therefor.

Column 16, Line 26, delete "$U_t$" and insert -- $U_t$ -- therefor.

Column 16, Line 27, delete "n-qubit" and insert -- $n$-qubit -- therefor.

Column 16, Line 27, delete "$|\Phi_t\rangle.$" and insert -- $|\Phi_t\rangle.$ -- therefor.

Column 16, Line 27, delete "t" and insert -- $t$ -- therefor.

Column 16, Line 50, delete "δ and μ." and insert -- $\delta$ and $\mu.$ -- therefor.

Column 16, Line 56, delete "δ and μ." and insert -- $\delta$ and $\mu.$ -- therefor.

Column 16, Line 58, delete "$U_t$" and insert -- $U_t$ -- therefor.

Column 16, Line 60, delete "n-qubit" and insert -- $n$-qubit -- therefor.

CERTIFICATE OF CORRECTION (continued)
U.S. Pat. No. 11,477,015 B1

Column 16, Lines 61-62, delete "$|\Phi_{t-1}\rangle$;" and insert -- $|\Phi_{t-1}\rangle.$ -- therefor.

Column 16, Line 63, delete "n-qubit" and insert -- $n$-qubit -- therefor.

Column 16, Line 65, delete "$|q_{-t}\rangle$;" and insert -- $|q_{-t}\rangle)$; -- therefor.

Column 16, Line 67, delete "$|q'_{-t}\rangle$;" and insert -- $|q'_{-t}\rangle)$; -- therefor.

Column 17, Line 1, delete "n-qubit" and insert -- $n$-qubit -- therefor.

Column 17, Lines 2-3, delete "$|q_{-t}\rangle$;" and insert -- $|q_{-t}\rangle)$; -- therefor.

Column 17, Line 5, delete "$|q'_{-t}\rangle$" and insert -- $|q'_{-t}\rangle)$; -- therefor.

Column 17, Line 6, delete "n-qubit" and insert -- $n$-qubit -- therefor.

Column 17, Line 6, delete "$|\Phi_t\rangle$." and insert -- $|\Phi_t\rangle.$ -- therefor.

Column 17, Lines 8-9, delete "$U_t(|\Phi_{t-1}\rangle \otimes |q_{-t}\rangle = |q'_{-t}\rangle \otimes |\Phi_t\rangle$" and insert -- $U_t(|\Phi_{t-1}\rangle \otimes |q_{-t}\rangle) = |q'_{-t}\rangle \otimes |\Phi_t\rangle$ -- therefor.

Column 17, Line 11, delete "$U_t$" and insert -- $U_t$ -- therefor.

Column 17, Lines 13-14, delete "$|q_{-(t-1)}\rangle$." and insert -- $|q_{-(t-1)}\rangle.$ -- therefor.

Column 17, Lines 20-21, delete "$\langle q'_{-t}|q_{-(t-n)}\rangle \geq \tau$" and insert -- $\langle q'_{-t}|q_{-(t-n)}\rangle \geq \tau$ -- therefor.

CERTIFICATE OF CORRECTION (continued)
U.S. Pat. No. 11,477,015 B1

Column 17, Line 23, delete "n<t," and insert -- $n < t,$ -- therefor.

Column 17, Line 23, delete "n" and insert -- $n$ -- therefor.

Column 17, Line 24, delete "(t-n)" and insert -- $(t - n)$ -- therefor.

Column 17, Line 24, delete "n" and insert -- $n$ -- therefor.

Column 17, Line 48, delete "i" and insert -- $i$ -- therefor.

Column 17, Line 50, delete "i=0," and insert -- $i = 0,$ -- therefor.

Column 17, Line 57, delete "n" and insert -- $n$ -- therefor.

Column 17, Line 58, delete "i=t-n;" and insert -- $i = t - n;$ -- therefor.

Column 17, Line 59, delete "i=t-1;" and insert -- $i = t - 1;$ -- therefor.

Column 17, Line 60, delete "i=t." and insert -- $i = t.$ -- therefor.

Column 17, Line 62, delete "U$_i$," and insert -- $U_i,$ -- therefor.

Column 17, Line 65, delete "U$_i$," and insert -- $U_i,$ -- therefor.

Column 17, Line 66, delete "U$_i$," and insert -- $U_i,$ -- therefor.

Column 17, Line 67, delete "r" and insert -- $\tau$ -- therefor.

Column 18, Line 11, delete "n qubits," and insert -- $n$-qubits, -- therefor.

Column 18, Line 13, delete "n qubit," and insert -- $n$-qubit, -- therefor.

Column 18, Line 30, delete "n qubit," and insert -- $n$-qubit, -- therefor.

Column 18, Lines 31-33, delete "$|\Phi_0\rangle = \Sigma_{q_{n-1}\in\{0,1\}} \cdots \Sigma_{q_0\in\{0,1\}} \lambda n-1,\ldots,0 |q_{n-1}\ldots q_0\rangle \in B^n$" and insert -- $|\Phi_0\rangle = \Sigma_{q_{n-1}\in\{0,1\}} \cdots \Sigma_{q_0\in\{0,1\}} \lambda n - 1,\ldots,0|q_{n-1}\ldots q_0\rangle \in B^n$ -- therefor.

Column 18, Line 35, delete "$B = \text{span}_\mathbb{C}\{|0\rangle, |1\rangle\}.$" insert -- $B = \text{span}_\mathbb{C}\{|0\rangle, |1\rangle\}.$ -- therefor.

Column 18, Line 45, delete "n-1" and insert -- $n - 1$ -- therefor.

CERTIFICATE OF CORRECTION (continued)
U.S. Pat. No. 11,477,015 B1

Column 18, Line 49, delete "n-qubit" and insert -- $n$-qubit -- therefor.

Column 18, Line 51, delete "(n+1)-qubit" and insert -- ($n + 1$)-qubit -- therefor.

Column 18, Line 55, delete "$|\Phi_1\rangle$." and insert -- $|\Phi_1\rangle$. -- therefor.

Column 18, Line 56, delete "n," and insert -- $n$, -- therefor.

Column 18, Line 59, delete "U$_{t1}$" and insert -- $U_{t1}$ -- therefor.

Column 18, Line 59, delete "t$_1$>n" and insert -- $t_1 > n$ -- therefor.

Column 18, Lines 64-65, delete "$\langle q''_{n-t1} | q_{n-t0} \rangle \geq \tau$," and insert -- $\langle q''_{n-t1} | q_{n-t0} \rangle \geq \tau$ -- therefor.

Column 18, Line 66, delete "τ." and insert -- $\tau$. -- therefor.

Column 19, Line 7, delete "U$_{ti}$." and insert -- $U_{ti}$. -- therefor.

Column 19, Line 16, delete "U" and insert -- $U$ -- therefor.

Column 19, Line 17, delete "n qubits," and insert -- $n$-qubits, -- therefor.

Column 19, Line 17, delete "U" and insert -- $U$ -- therefor.

Column 19, Line 21, "$\forall \varphi \in [0, 2\pi), \|U - e^{i\varphi}\mathbb{1}\| \geq \delta$," and insert -- $\forall \varphi \in [0, 2\pi), \|U - e^{i\varphi}\mathbb{1}\| \geq \delta$ -- therefor.

Column 19, Lines 22-23, delete "$\exists \varphi \in [0, 2\pi)$, such that $\|U - e^{i\varphi}\mathbb{1}\| \leq \mu$," and insert -- $\exists \varphi \in [0, 2\pi)$, such that $\|U - e^{i\varphi}\mathbb{1}\| \leq \mu$ -- therefor.

Column 19, Line 24, delete "$1/(\delta-\mu) \in \mathcal{O}(\mathrm{poly}(n))$." and insert -- $1/(\delta - \mu) \in O(\mathrm{poly}(n))$. -- therefor.

Column 19, Line 25, delete "δ, μ" and insert -- $\delta, \mu$ -- therefor.

CERTIFICATE OF CORRECTION (continued)
U.S. Pat. No. 11,477,015 B1

Column 19, Line 28, delete "$\mu < ||U-e^{i\varphi}\mathbb{1}|| < \delta.$," and insert -- $\mu < ||U - e^{i\varphi}\mathbb{1}|| < \delta.$ -- therefor.

Column 19, Lines 40-43, delete "$|\Phi_0\rangle = \Sigma_{q_{n-1}\in\{0,1\}} \ldots \Sigma_{q_0\in\{0,1\}} \lambda n-1, \ldots, 0|q_{n-1} \ldots q_0\rangle \in B^n,$" and insert -- $|\Phi_0\rangle = \sum_{q_{n-1}\in\{0,1\}} \cdots \sum_{q_0\in\{0,1\}} \lambda n - 1, \ldots, 0|q_{n-1} \ldots q_0\rangle \in B^n ,$ -- therefor.

Column 19, Line 44, delete "n qubits." and insert -- $n$-qubits. -- therefor.

Column 19, Line 45, delete "$|q_{-t}\rangle$," and insert -- $|q_{-t}\rangle,$ -- therefor.

Column 19, Line 47, delete "U$_t$," and insert -- $U_t$ -- therefor.

Column 19, Lines 51-53, delete "$U_t: B^n \times B \to B \times B^n, \; U_t(|\Phi_{t-1}\rangle \otimes |q_{-t}\rangle) = |q'_{-t}\rangle \otimes |\Phi_t\rangle.$," and insert -- $U_t : B^n \times B \longrightarrow B \times B^n, \quad U_t(|\Phi_{t-1}\rangle \otimes |q_{-t}\rangle) = |q'_{-t}\rangle \otimes |\Phi_t\rangle .$ -- therefor.

Column 19, Line 54, delete "U$_t$," and insert -- $U_t$ -- therefor.

Column 19, Lines 54-55, delete "NIC[δ, μ] ." and insert -- NIC[$\delta, \mu$] . -- therefor.

Column 19, Lines 56-57, delete "$\langle q'_{-t}|q_{-(\tau-n)}\rangle \geq \tau$ for t>n." and insert -- $\langle q'_{-t}|q_{-(t-n)}\rangle \geq \tau$ for $t > n$ . -- therefor.

Column 20, Line 19, delete "U$_1$ and U$_2$," and insert -- $U_1$ and $U_2$, -- therefor.

Column 20, Line 20, delete "n qubits," and insert -- $n$-qubits, -- therefor.

Column 20, Line 23, before "not).", insert -- or --.

Column 20, Lines 23-24, delete "U$_1$, U$_2$," and insert -- $U_1$, $U_2$, -- therefor.

Column 20, Line 24, delete "U$_1$ and U$_2$," and insert -- $U_1$ and $U_2$, -- therefor.

Column 20, Line 24, delete "rare" and insert -- $\mathcal{V}$ are -- therefor.

Column 20, Lines 28-30, delete "∃|ψ⟩∈𝒱, such that ∀φ∈[0,2π), ||(U₁U₂†−e^iφ𝟙)|ψ⟩||≥δ" and insert -- $\exists |\psi\rangle \in \mathscr{V},\ \text{such that}\ \forall \varphi \in [0, 2\pi),\ \| (U_1 U_2^\dagger - e^{i\varphi}\mathbb{1})|\psi\rangle \| \geq \delta$ -- therefor.

Column 20, Lines 32-34, delete "∃φ∈[0,2π), such that ∀|ψ⟩∈𝒱, ||(U₁U₂†−e^iφ𝟙)|ψ⟩||≤μ" and insert -- $\exists \varphi \in [0, 2\pi),\ \text{such that}\ \forall |\psi\rangle \in \mathscr{V},\ \| (U_1 U_2^\dagger - e^{i\varphi}\mathbb{1})|\psi\rangle \| \leq \mu$ -- therefor.

Column 20, Line 35, delete "$1/(\delta - \mu) \in \mathcal{O}(\text{poly}(n))$." and insert -- $1/(\delta - \mu) \in \mathcal{O}(\text{poly}(n))$. -- therefor.

Column 20, Line 42, delete "network!" and insert -- network. -- therefor.

In the Claims

Column 22, Line 61, Claim 1, delete "t" and insert -- $t$ -- therefor.

Column 22, Line 63, Claim 1, delete "n-qubit" and insert -- $n$-qubit -- therefor.

Column 22, Line 64, Claim 1, delete "$|\Phi_{t-1}\rangle$;" and insert -- $|\Phi_{t-1}\rangle$, -- therefor.

Column 22, Line 65, Claim 1, delete "n-qubit" and insert -- $n$-qubit -- therefor.

Column 22, Lines 66-67, Claim 1, delete "$|\Phi t\rangle$;" and replace with -- $|\Phi_t\rangle$; -- therefor.

Column 23, Line 16, Claim 5, delete "U$_t$" and insert -- $U_t$ -- therefor.

Column 23, Line 19, Claim 5, delete "n-qubit" and insert -- $n$-qubit -- therefor.

Column 23, Line 19, Claim 5, delete "$|\Phi_{t-1}\rangle$;" and insert -- $|\Phi_{t-1}\rangle$, -- therefor.

Column 23, Line 20, Claim 5, delete "n-qubit" and insert -- $n$-qubit -- therefor.

CERTIFICATE OF CORRECTION (continued)
U.S. Pat. No. 11,477,015 B1

Column 23, Line 25, Claim 6, delete "$|q_{-t}\rangle;$" and insert -- $|q_{-t}\rangle;$ -- therefor.

Column 23, Lines 27-28, Claim 6, delete "$|q'_{-t}\rangle;$" and insert -- $|q'_{-t}\rangle;$ -- therefor.

Column 23, Line 31, Claim 6, delete "n-qubit" and insert -- *n*-qubit -- therefor.

Column 23, Line 32, Claim 6, delete "$|q_{-t}\rangle;$" and insert -- $|q_{-t}\rangle;$ -- therefor.

Column 23, Line 35, Claim 6, delete "n-qubit" and insert -- *n*-qubit -- therefor.

Column 23, Line 36, Claim 6, delete "$|\Phi_t\rangle;$" and replace with -- $|\Phi_t\rangle;$ -- therefor.

Column 23, Lines 37-38, Claim 6, delete "$U_t(|\Phi_{t-1}\rangle \otimes |q_{-t}\rangle) = |q'_{-t}\rangle \otimes |\Phi_t\rangle.$" and insert -- $U_t(|\Phi_{t-1}\rangle \otimes |q_{-t}\rangle) = |q'_{-t}\rangle \otimes |\Phi_t\rangle.$ -- therefor.

Column 23, Lines 50-51, Claim 8, delete "$\langle q'_{-t}|q_{-(t-n)}\rangle \geq \tau,$" and insert -- $\langle q'_{-t}|q_{-(t-n)}\rangle \geq \tau,$ -- therefor.

Column 23, Line 52, Claim 8, delete "n<t," and insert -- *n* < *t*, -- therefor.

Column 24, Line 21, Claim 15, delete "t," and insert -- *t*, -- therefor.

Column 24, Line 23, Claim 15, delete "n-qubit" and insert -- *n*-qubit -- therefor.

Column 24, Line 24, Claim 15, delete "$|\Phi_{t-1}\rangle,$" and insert -- $|\Phi_{t-1}\rangle,$ -- therefor.

Column 24, Line 25, Claim 15, delete "n-qubit" and insert -- *n*-qubit -- therefor.

Column 24, Line 26, Claim 15, delete "$|\Phi_t\rangle;$" and replace with -- $|\Phi_t\rangle;$ -- therefor.

CERTIFICATE OF CORRECTION (continued)
U.S. Pat. No. 11,477,015 B1

Column 24, Line 47, Claim 19, delete "t," and insert -- $t,$ -- therefor.

Column 24, Line 49, Claim 19, delete "n-qubit" and insert -- $n$-qubit -- therefor.

Column 24, Line 50, Claim 19, delete "$|\Phi_{t-1}\rangle,$" and insert -- $|\Phi_{t-1}\rangle,$ -- therefor.

Column 24, Line 51, Claim 19, delete "n-qubit" and insert -- $n$-qubit -- therefor.

Column 24, Line 52, Claim 19, delete "$|\Phi_t\rangle;$" and replace with -- $|\Phi_t\rangle;$ -- therefor.